US009998807B2

(12) United States Patent
Bai

(10) Patent No.: US 9,998,807 B2
(45) Date of Patent: Jun. 12, 2018

(54) METHOD AND APPARATUS FOR ESTABLISHING TRAIL NETWORK

(71) Applicant: HUAWEI TECHNOLOGIES CO., LTD., Shenzhen (CN)

(72) Inventor: Tao Bai, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 86 days.

(21) Appl. No.: 15/014,327

(22) Filed: Feb. 3, 2016

(65) Prior Publication Data
US 2016/0157000 A1 Jun. 2, 2016

Related U.S. Application Data

(63) Continuation of application No. PCT/CN2014/083615, filed on Aug. 4, 2014.

(30) Foreign Application Priority Data

Aug. 8, 2013 (CN) .......................... 2013 1 0344348

(51) Int. Cl.
*H04L 12/28* (2006.01)
*H04Q 11/00* (2006.01)
(Continued)

(52) U.S. Cl.
CPC ......... *H04Q 11/0066* (2013.01); *H04L 29/06* (2013.01); *H04L 45/00* (2013.01);
(Continued)

(58) Field of Classification Search
CPC .... H04L 12/56; H04L 2012/56; H04L 49/255
See application file for complete search history.

(56) References Cited

U.S. PATENT DOCUMENTS

| 6,847,607 B1* | 1/2005 | Kasdan | .................. | H04L 45/00 370/225 |
| 2003/0161304 A1* | 8/2003 | deBoer | .................. | H04L 45/00 370/386 |

(Continued)

FOREIGN PATENT DOCUMENTS

| CN | 1812401 A | 8/2006 |
| CN | 101616061 A | 12/2009 |

(Continued)

OTHER PUBLICATIONS

Lee et al., "Exclude Routes-Extension to Resource Reservation Protocol-Traffic Engineering (RSVP-TE)", Network Working Group, The IETF Trust, Apr. 2007, 27 pages.
Bradford et al., "Preserving Topology Confidentiality in Inter-Domain Path Computation Using a Path-Key-Based Mechanism", Network Working Group, The IETF Trust, Apr. 2009, 19 pages.
(Continued)

*Primary Examiner* — Siren Wei
(74) *Attorney, Agent, or Firm* — Staas & Halsey LLP

(57) ABSTRACT

A method and an apparatus establish a trail in a network, where the method includes: in a process of establishing a first trail, adding, by a first ingress node to a first trail establishment response message, an IP address of the first ingress node and an optical domain; and in a process of establishing a second trail, receiving, by the first ingress node, a first trail request message sent by a second ingress node; and sending, by the first ingress node to the second ingress node in the optical domain, information about a trail that is of the first trail and is in the optical domain to which the first ingress node belongs. According to the embodiments, that a trail that is of a working trail and a protection trail are in each optical domain do not overlap can be met.

8 Claims, 6 Drawing Sheets

(51) Int. Cl.
*H04L 29/06* (2006.01)
*H04L 12/701* (2013.01)
*H04L 12/707* (2013.01)
*H04Q 3/66* (2006.01)
*H04L 12/741* (2013.01)
*H04L 12/735* (2013.01)

(52) U.S. Cl.
CPC ............ H04L 45/22 (2013.01); H04L 45/745 (2013.01); H04Q 3/66 (2013.01); H04Q 11/00 (2013.01); *H04L 45/128* (2013.01); *H04Q 2011/0073* (2013.01)

(56) References Cited

U.S. PATENT DOCUMENTS

| | | |
|---|---|---|
| 2006/0083251 A1 | 4/2006 | Kataoka et al. |
| 2007/0153677 A1* | 7/2007 | McLaughlin ........... H04L 45/00 370/216 |
| 2008/0175144 A1 | 7/2008 | Lu et al. |

FOREIGN PATENT DOCUMENTS

| | | |
|---|---|---|
| CN | 101662409 A | 3/2010 |
| CN | 103414633 A | 11/2013 |
| EP | 1 675 326 A1 | 6/2006 |
| WO | 2013/034201 A1 | 3/2013 |

OTHER PUBLICATIONS

Lang et al., "RSVP-TE Extensions in Support of End-to-End Generalized Multi-Protocol Label Switching (GMPLS) Recovery", Network Working Group, The IETF Trust, May 2007, 47 pages.
Papadimitriou et al. "Generalized MPLS (GMPLS) Protocol Extensions for Multi-Layer and Multi-Region Networks (MLN/MRN)", Internet Engineering Task Force (IETF), Oct. 2010, 24 pages.
Le Faucheur et al., "RSVP Resource Sharing Remote Identification Association draft-ietf-ccamp-rsvp-resource-sharing-02.txt", CCAMP, IETF Trust, Jul. 25, 2011, 11 pages.
Berger, "Usage of The RSVP Association Object draft-ietf-ccamp-assoc-info-03.txt", IETF Trust, Oct. 25, 2011, 12 pages.
Berger et al., "RSVP Association Object Extensions draft-ietf-ccamp-assoc-ext-01.txt", IETF Trust, Oct. 28, 2011, 16 pages.
Fedyk et al., "Layer 1 VPN Enhanced Mode—Overlay Extension Service Model draft-fedyk-ccamp-l1vpn-extnd-overlay-00.txt", Network Working Group, IETF Trust, Jul. 9, 2012, 18 pages.
Romeral et al., " End-to-end Survivable Connections in Multi-Domain GMPLS Networks", ResearchGate, 11 pages.
International Search Report dated Oct. 29, 2014 in corresponding International Patent Application No. PCT/CN2014/083615.
Chinese Office Action dated Dec. 15, 2015 in corresponding Chinese Patent Application No. 201310344348.8.
Extended European Search Report dated Mar. 2, 2016 in corresponding European Patent Application No. 14833688.6.
International Search Report dated Oct. 29, 2014, in corresponding International Application No. PCT/CN2014/083615.

* cited by examiner

METHOD AND APPARATUS FOR ESTABLISHING TRAIL NETWORK

CROSS-REFERENCE TO RELATED APPLICATIONS

This application is a continuation of International Application No. PCT/CN2014/083615, filed on Aug. 4, 2014, which claims priority to Chinese Patent Application No. 201310344348.8, filed on Aug. 8, 2013, both of which are hereby incorporated by reference in their entireties.

TECHNICAL FIELD

Embodiments of the present invention relate to the communications field, and in particular, to a method and an apparatus for establishing a trail in a network.

BACKGROUND

With continuous growth of an Internet Protocol (IP) service, pressure on an IP backbone network continuously increases. A conventional synchronous digital hierarchy (SDH, Synchronous Digital Hierarchy) network also steadily evolves into an intelligent automatically switched optical network (ASON, Automatically Switched Optical Network).

A key problem for a routing domain to access an optical network is to ensure that a working trail and a protection trail in the optical network do not overlap. At present, access by the routing domain to the optical network is implemented mainly by using an overlay (OVERLAY) model. In the OVERLAY model, layer separation between an optical domain and a routing domain enables separate running of the optical domain and the routing domain; information isolation between the optical domain and the routing domain enables very good access security of the optical domain.

However, because information is completely isolated between the optical domain and the routing domain, when the routing domain accesses the optical domain, for protection of various types of tunnel triggered and established by the routing domain, an effective mechanism is required to ensure that a working trail and a protection trail that are of the tunnels do not cross or overlap in the optical domain. To resolve this problem, in the prior art, information about a trail that is of the working trail and is in each optical domain needs to be saved into a head-end router; in addition, when a protection trail of the working trail is established, a protection trail establishment request sent by the head-end router carries the information about the trail that is of the working trail and is in each optical domain, thereby ensuring that a trail that is of the protection trail and is in each optical domain and that of the working trail and is in each optical domain do not overlap.

However, in such a trail establishing manner, information about a trail that is of a working trail and is in an optical domain needs to be leaked to a routing domain, which can still cause inter-domain leakage of information in the optical domain, thereby reducing access security of the optical domain.

SUMMARY

Embodiments of the present invention provide a method and an apparatus for establishing a trail in a network, which can meet that a trail that is of a working trail and is in each optical domain and a trail that is of a protection trail and is in each optical domain do not overlap, and prevent inter-domain leakage of information in the optical domain, thereby improving access security of the optical domain.

According to a first aspect, a method for establishing a trail in a network is provided, where the network includes: a head-end router, a tail-end router, and at least one optical domain; each optical domain includes a first ingress node and a second ingress node; a first trail between the head-end router and the tail-end router passes through the first ingress node of each optical domain; and a second trail between the head-end router and the tail-end router passes through the second ingress node of each optical domain, where the method includes:

in a process of establishing the first trail, receiving, by the first ingress node, a first trail establishment request message sent by a previous-hop node, determining a trail that is of the first trail and is in an optical domain to which the first ingress node belongs, and sending, according to the determined trail, the first trail establishment request message to a next-hop node of the optical domain to which the first ingress node belongs; and receiving, by the first ingress node, a first trail establishment response message that is sent by the next-hop node according to the trail that is of the first trail and is in the optical domain to which the first ingress node belongs, adding, to the first trail establishment response message, an Internet Protocol IP address of the first ingress node and the optical domain to which the first ingress node belongs, and sending the first trail establishment response message to the previous-hop node; and in a process of establishing the second trail, receiving, by the first ingress node, a first trail request message sent by the second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message; and sending, by the first ingress node to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap.

With reference to the first aspect, in a first possible implementation manner of the first aspect, the adding, by the first ingress node to the first trail establishment response message, an IP address of the first ingress node and the optical domain to which the first ingress node belongs includes:

adding, by the first ingress node to the first trail establishment response message, the IP address of the first ingress node and the optical domain to which the first ingress node belongs, when determining that the previous-hop node of the first ingress node and the first ingress node are not located in a same domain.

According to a second aspect, a method for establishing a trail in a network is provided, where the network includes: a head-end router, a tail-end router, and at least one optical domain; each optical domain includes a first ingress node and a second ingress node; a first trail between the head-end router and the tail-end router passes through the first ingress node of each optical domain; and a second trail between the head-end router and the tail-end router passes through the second ingress node of each optical domain, where the method includes:

in a process of establishing the second trail, receiving, by the second ingress node, a second trail establishment request message, where the second trail establishment request message carries an IP address of the first ingress node and an optical domain to which the first ingress node belongs;

sending, by the second ingress node according to the IP address of the first ingress node and the optical domain to which the first ingress node belongs, a first trail request message to the first ingress node in an optical domain to which the second ingress node belongs; and receiving, by the second ingress node, information about a trail that is of the first trail and is in the optical domain to which the second ingress node belongs, where the information is sent by the first ingress node in the optical domain to which the second ingress node belongs, and determining, according to the information about the trail, a trail that is of the second trail and is in the optical domain to which the second ingress node belongs, where the second trail and the first trail do not overlap.

With reference to the second aspect, in a first possible implementation manner of the second aspect, the sending, by the second ingress node according to the IP address of the first ingress node and the optical domain to which the first ingress node belongs, a first trail request message to the first ingress node in an optical domain to which the second ingress node belongs includes:

determining, by the second ingress node according to the IP address of the first ingress node and the optical domain to which the first ingress node belongs, an IP address of the first ingress node in the optical domain to which the second ingress node belongs; and sending, by the second ingress node according to the IP address of the first ingress node in the optical domain to which the second ingress node belongs, the first trail request message to the first ingress node in the optical domain to which the second ingress node belongs.

According to a third aspect, an apparatus for establishing a trail in a network is provided, where the apparatus is applied to a first ingress node in the network; the network includes: a head-end router, a tail-end router, and at least one optical domain; each optical domain includes a first ingress node and a second ingress node; a first trail between the head-end router and the tail-end router passes through the first ingress node of each optical domain; and a second trail between the head-end router and the tail-end router passes through the second ingress node of each optical domain, where the apparatus includes:

a first receiving unit, configured to receive, in a process of establishing the first trail, a first trail establishment request message sent by a previous-hop node of the first ingress node;

a determining unit, configured to determine a trail that is of the first trail and is in an optical domain to which the first ingress node belongs; and a first sending unit, configured to send, according to the trail determined by the determining unit, the first trail establishment request message to a next-hop node of the optical domain to which the first ingress node belongs, where the first receiving unit is further configured to receive a first trail establishment response message that is sent by the next-hop node according to the trail that is of the first trail and is in the optical domain to which the first ingress node belongs;

the first sending unit is further configured to add, to the first trail establishment response message received by the first receiving unit, an Internet Protocol IP address of the first ingress node and the optical domain to which the first ingress node belongs, and send the first trail establishment response message to the previous-hop node of the first ingress node;

the first receiving unit is further configured to receive, in a process of establishing the second trail, a first trail request message sent by the second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message; and the first sending unit is further configured to send, to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap.

With reference to the third aspect, in a first possible implementation manner of the third aspect, the first sending unit is specifically configured to:

when determining that the previous-hop node of the first ingress node and the first ingress node are not located in a same domain, add, to the first trail establishment response message, the IP address of the first ingress node and the optical domain to which the first ingress node belongs.

According to a fourth aspect, an apparatus for establishing a trail in a network is provided, where the apparatus is applied to a second ingress node in the network; the network includes: a head-end router, a tail-end router, and at least one optical domain; each optical domain includes a first ingress node and a second ingress node; a first trail between the head-end router and the tail-end router passes through the first ingress node of each optical domain; and a second trail between the head-end router and the tail-end router passes through the second ingress node of each optical domain, where the apparatus includes:

a second receiving unit, configured to receive, in a process of establishing the second trail, a second trail establishment request message, where the second trail establishment request message carries an Internet Protocol IP address of the first ingress node and an optical domain to which the first ingress node belongs;

a second sending unit, configured to send, according to the IP address of the first ingress node and the optical domain to which the first ingress node belongs, a first trail request message to the first ingress node in an optical domain to which the second ingress node belongs, where the IP address and the optical domain are received by the second receiving unit, and where the second receiving unit is further configured to receive information about a trail that is of the first trail and is in the optical domain to which the second ingress node belongs, where the information is sent by the first ingress node in the optical domain to which the second ingress node belongs; and a trail determining unit, configured to determine, according to the information that is about the trail and is received by the second receiving unit, a trail that is of the second trail and is in the optical domain to which the second ingress node belongs, where the second trail and the first trail do not overlap.

With reference to the fourth aspect, in a first possible implementation manner of the fourth aspect, the second sending unit is specifically configured to:

determine, according to the IP address of the first ingress node and the optical domain to which the first ingress node belongs, an IP address of the first ingress node in the optical domain to which the second ingress node belongs; and send, according to the IP address of the first ingress node in the optical domain to which the second ingress node belongs, the first trail request message to the first ingress node in the optical domain to which the second ingress node belongs.

In the embodiments, in a process of establishing a first trail, a first ingress node receives a first trail establishment request message sent by a previous-hop node, determines a trail that is of the first trail and is in an optical domain to which the first ingress node belongs, and sends, according to the determined trail, the first trail establishment request message to a next-hop node of the optical domain to which the first ingress node belongs; and the first ingress node receives a first trail establishment response message that is sent by the next-hop node according to the trail that is of the first trail and is in the optical domain to which the first ingress node belongs, and adds, to the first trail establishment response message, an Internet Protocol IP address of the first ingress node and the optical domain to which the first ingress node belongs, and sends the first trail establishment response message to the previous-hop node; and in a process of establishing a second trail, the first ingress node receives a first trail request message sent by a second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message; and the first ingress node sends, to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap. The first ingress node sends, to the second ingress node in the optical domain to which the first ingress node belongs, the information about the trail that is of the first trail and is in the optical domain to which the first ingress node belongs, so that the second ingress node determines, according to the information about the trail, the trail that is of the second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention may be applied to the following network architecture, where the network architecture may include: a head-end router, a tail-end router, and at least one optical domain; each optical domain includes a first ingress node and a second ingress node; a first trail between the head-end router and the tail-end router passes through the first ingress node of each optical domain; a second trail between the head-end router and the tail-end router passes though the second ingress node of each optical domain; and the head-end router is a start node of the first trail and the second trail, and the tail-end router is an end node of the first trail and the second trail.

Figure 1:
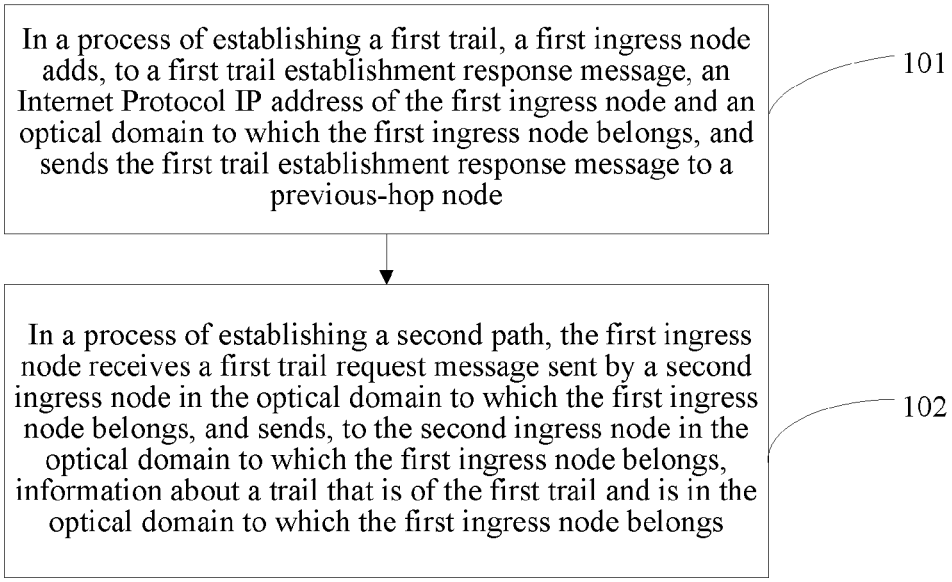
FIG. 1 is a schematic diagram of a first embodiment of a method for establishing a trail in a network according to the present invention.

Referring to FIG. 1, FIG. 1 is a schematic diagram of a first embodiment of a method for establishing a trail in a network according to the present invention, where the method includes:

Step 101: In a process of establishing the first trail, the first ingress node receives a first trail establishment request message sent by a previous-hop node, determines a trail that is of the first trail and is in an optical domain to which the first ingress node belongs, and sends, according to the determined trail, the first trail establishment request message to a next-hop node of the optical domain to which the first ingress node belongs; and the first ingress node receives a first trail establishment response message that is sent by the next-hop node according to the trail that is of the first trail and is in the optical domain to which the first ingress node belongs, adds, to the first trail establishment response message, an Internet Protocol IP address of the first ingress node and the optical domain to which the first ingress node belongs, and sends the first trail establishment response message to the previous-hop node.

Step 102: In a process of establishing the second trail, the first ingress node receives a first trail request message sent by the second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message; and the first ingress node sends, to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

Figure 2:
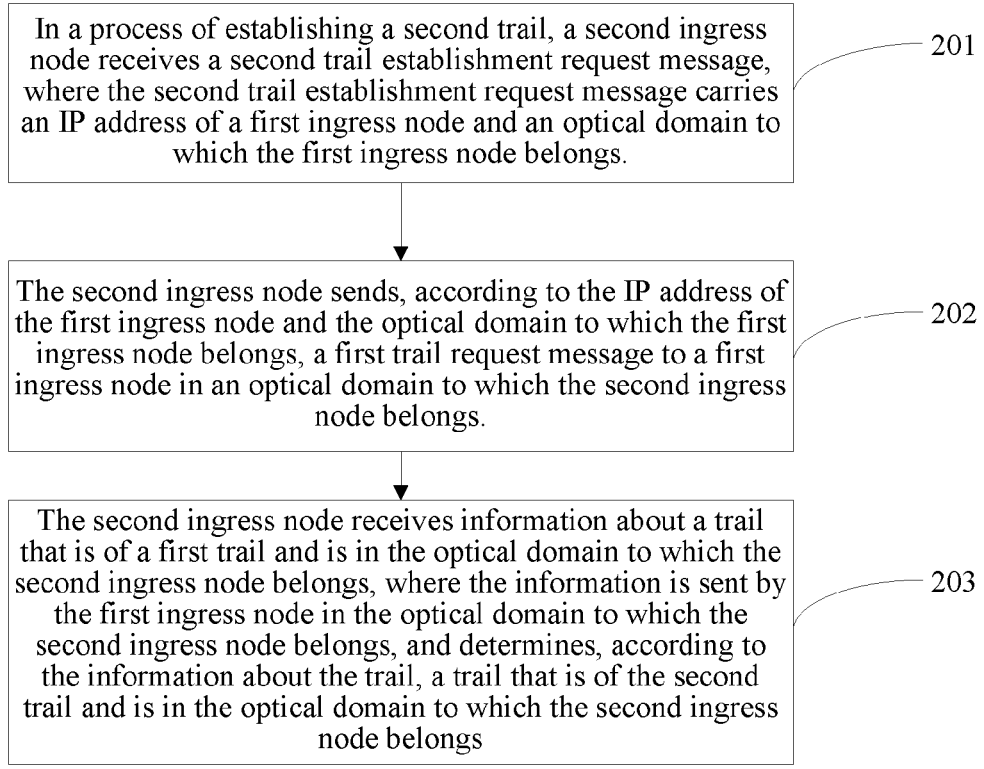
FIG. 2 is a schematic diagram of a second embodiment of a method for establishing a trail in a network according to the present invention.

Referring to FIG. 2, FIG. 2 is a schematic diagram of a second embodiment of a method for establishing a trail in a network according to the present invention, where the method includes:

Step 201: In a process of establishing the second trail, the second ingress node receives a second trail establishment request message, where the second trail establishment request message carries an IP address of the first ingress node and an optical domain to which the first ingress node belongs.

Step 202: The second ingress node sends, according to the IP address of the first ingress node and the optical domain to which the first ingress node belongs, a first trail request message to the first ingress node in an optical domain to which the second ingress node belongs.

Step 203: The second ingress node receives information about a trail that is of a first trail and is in the optical domain to which the second ingress node belongs, where the information is sent by the first ingress node in the optical domain to which the second ingress node belongs, and determines, according to the information about the trail, a trail that is of the second trail and is in the optical domain to which the second ingress node belongs, where the second trail and the first trail do not overlap.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

Figure 3:
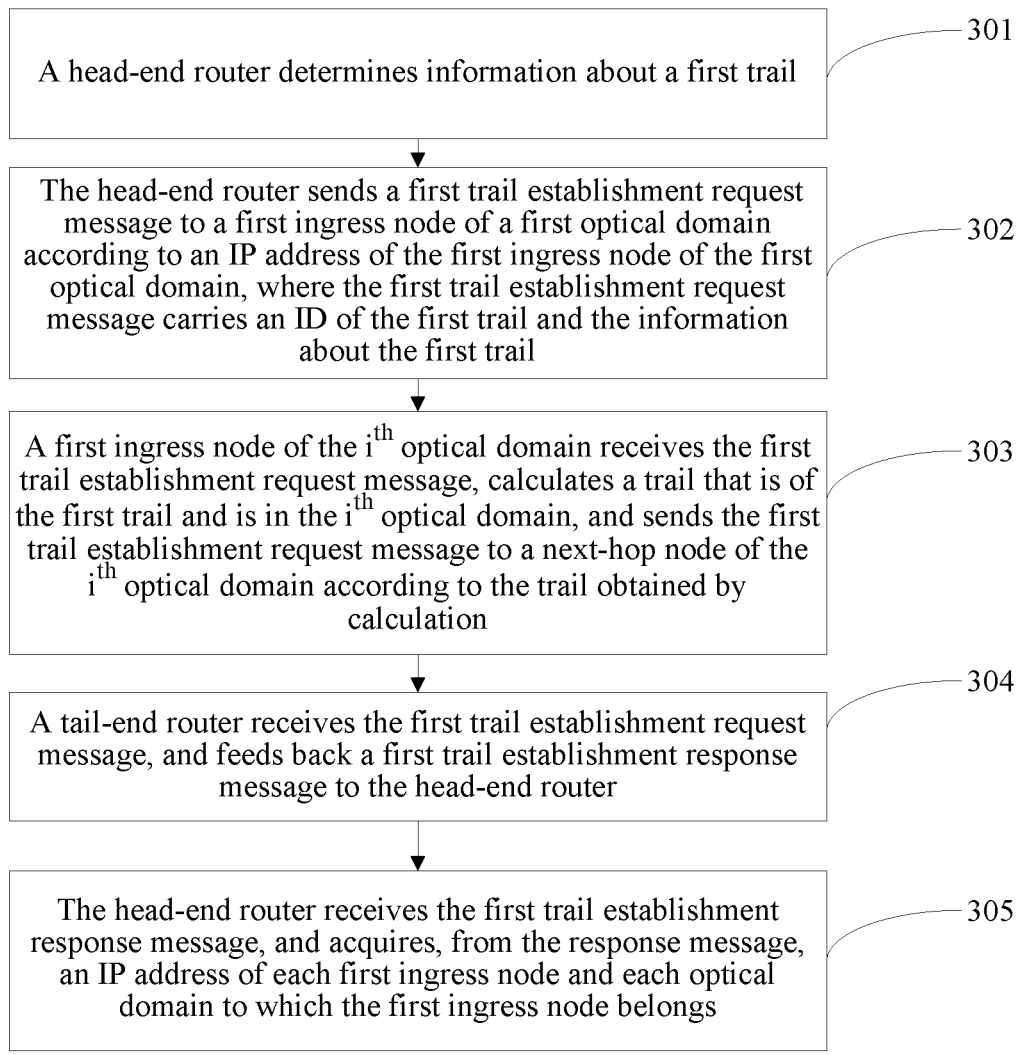
FIG. 3 is a schematic diagram of a third embodiment of a method for establishing a trail in a network according to the present invention.

Referring to FIG. 3, FIG. 3 is a flowchart of a third embodiment of a method for establishing a trail in a network according to the present invention, where in the method, an example is used to describe mainly a process of establishing a first trail in this embodiment of the present invention.

For ease of description, as shown in FIG. 3, in this embodiment of the present invention, a first-trail-based previous-hop node of a node, a first-trail-based next-hop node of a node, a first-trail-based previous-hop node of an optical domain, and a first-trail-based next-hop node of an optical domain are respectively referred to as a previous-hop node of a node, a next-hop node of a node, a previous-hop node of an optical domain, and a next-hop node of an optical domain for short.

As shown in FIG. 3, the method includes:

Step 301: A head-end router determines information about the first trail.

The information about the first trail may include: an IP address of the head-end router, an IP address of a tail-end router, an IP address of a first ingress node of each optical domain.

The head-end router and the tail-end router are respectively a start node and an end node that are of the first trail, and a quantity of optical domains that may be included between the head-end router and the tail-end router is random, which is not limited herein.

Details about how the head-end router determines the information about the first trail are not described herein again.

Step 302: The head-end router sends a first trail establishment request message to a first ingress node of a first optical domain according to an IP address of the first ingress node of the first optical domain, where the first trail establishment request message carries: an ID of the first trail and the information about the first trail.

Step 303: A first ingress node of a $i^{th}$ optical domain receives the first trail establishment request message, calculates, according to an IP address that is of a next-hop node of the $i^{th}$ optical domain and is carried in the first trail establishment request message, a trail that is of the first trail and is in the $i^{th}$ optical domain, and sends the first trail establishment request message to the next-hop node of the $i^{th}$ optical domain according to the trail obtained by calculation, until the next-hop node of the $i^{th}$ optical domain is a tail-end router, where a value of i is successively 1, ..., and n, where n is a nature number, and n is a total quantity of optical domains between the head-end router and the tail-end router.

When n=1, that is, when only one optical domain, that is, the first optical domain, is included between the head-end router and the tail-end router, the next-hop node of the first optical domain is the tail-end router; and in this case, Step 303 needs to be performed only once.

When n is a nature number greater than 1, that is, when at least two optical domains are included between the head-end router and the tail-end router, if i<n, the next-hop node of the $i^{th}$ optical domain is a first ingress node of the $(i+1)^{th}$ optical domain, and if i=n, a next-hop node of the $n^{th}$ optical domain is the tail-end router; and in this case, Step 303 needs to be cyclically performed for n times so as to send the first trail establishment request message to the tail-end router.

That the first ingress node of the $i^{th}$ optical domain sends the first trail establishment request message to the next-hop node of the $i^{th}$ optical domain according to the trail obtained by calculation refers to a process in which the first ingress node of the $i^{th}$ optical domain sends the first trail establishment request message to the next-hop node that is of the $i^{th}$ optical domain and is on the trail obtained by calculation, and then by analogy, a node on the trail obtained by calculation sends the first trail establishment request message to the next-hop node of the $i^{th}$ optical domain hop by hop.

Each node that transmits the first trail establishment request message, including the tail-end router, locally stores, in the node, the ID of the first trail and an IP address of a previous-hop node.

In addition, a first ingress node of each optical domain stores the trail that is of the first trail, is in the $i^{th}$ optical domain, and is obtained by calculation. Specifically, the first ingress node of each optical domain may correspondingly store the trail that is of the first trail and is in the $i^{th}$ optical domain and the ID of the first trail.

Step 304: The tail-end router receives the first trail establishment request message, and feeds back a first trail establishment response message to the head-end router.

The first trail establishment response message is inversely transmitted from the tail-end router to the head-end router hop by hop according to a transmission trail of the first trail establishment request message. Specifically, for a node that transmits the first trail establishment request message except the first ingress node of each optical domain, the node receives the first trail establishment response message, determines, according to the ID of the first trail and the IP address of the previous-hop node that are locally stored in the node, an IP address of a previous-hop node corresponding to the ID, carried in the response message, of the first trail, and sends the response message to the previous-hop node according to the IP address of the previous-hop node; and for the first ingress node of each optical domain, the first ingress node receives the response message, determines, according to the ID of the first trail and the IP address of the previous-hop node that are locally stored in the node, the IP address of the previous-hop node corresponding to the ID, carried in the response message, of the first trail, adds, to the response message, an IP address of the first ingress node and an optical domain to which the first ingress node belongs, and sends the response message to the previous-hop node according to the IP address of the previous hop node.

Configuration may be directly performed in advance in the first ingress node of each optical domain: When forwarding the response message, the first ingress node adds, to the response message, the IP address of the first ingress node and the optical domain to which the first ingress node belongs; or when receiving the response message and determining that the previous-hop node corresponding to the ID, carried in the response message, of the first trail and the first ingress node are not located in a same optical domain, the first ingress node of each optical domain may also add, to the response message, the IP address of the first ingress node and the optical domain to which the first ingress node belongs.

The first trail establishment response message includes: the ID of the first trail.

Step 305: The head-end router receives the first trail establishment response message, and acquires, from the response message, an IP address of each first ingress node and each optical domain to which the first ingress node belongs.

An association node object may be established in advance in the first trail establishment response message, where the association node object is used to store the IP address of the first ingress node and the optical domain to which the first ingress node belongs; then, the first ingress node of each optical domain only needs to directly add, to the association node object of the response message, the IP address of the first ingress node and the optical domain to which the first ingress node belongs; and in step 305, the head-end router may directly acquire the association node object from the response message, so as to acquire the IP address of each first ingress node and the optical domain to which each first ingress node belongs.

In this embodiment, in a process of establishing a first trail, when forwarding a first trail establishment response message, a first ingress node of each optical domain adds, to the first trail establishment response message, an IP address of the first ingress node and an optical domain to which the first ingress node belongs, and sends the first trail establishment response message to a head-end router.

Figure 4:
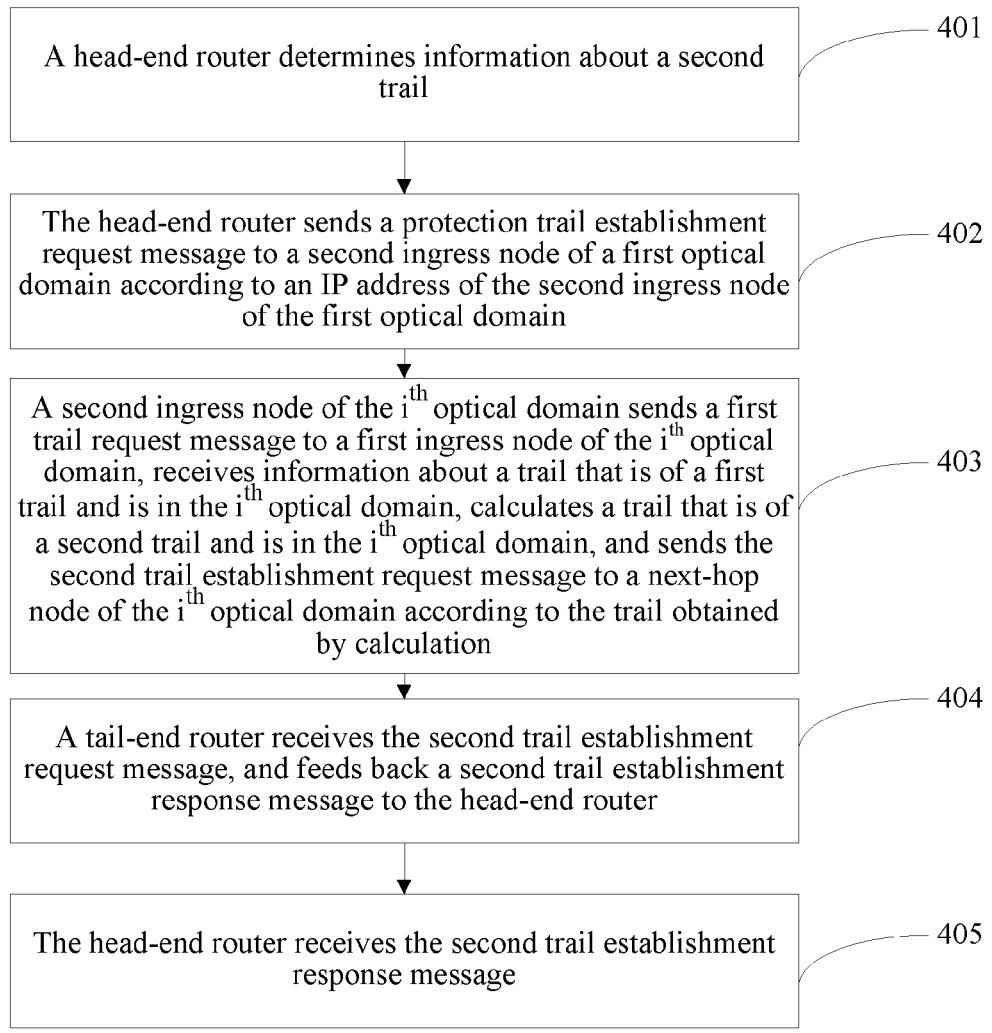
FIG. 4 is a schematic diagram of a fourth embodiment of a method for establishing a trail in a network according to the present invention.

Referring to FIG. 4, FIG. 4 is a flowchart of a fourth embodiment of a method for establishing a trail in a network according to the present invention, where in the method, an example is used to describe mainly a process of establishing a second trail in this embodiment of the present invention.

For ease of description, as shown in FIG. 4, in this embodiment of the present invention, a second-trail-based previous-hop node of a node, a second-trail-based next-hop node of a node, a second-trail-based previous-hop node of an optical domain, and a second-trail-based next-hop node of an optical domain are respectively referred to as a previous-hop node of a node, a next-hop node of a node, a previous-hop node of an optical domain, and a next-hop node of an optical domain for short.

The method includes:

Step 401: A head-end router determines information about the second trail.

The information about the second trail may include: an IP address of the head-end router, an IP address of a tail-end router, an IP address of a second ingress node of each optical domain.

Details about how the head-end router determines the information about the second trail are not described herein again.

The head-end router and the tail-end router are respectively a start node and an end node that are of the second trail, and a quantity of optical domains that may be included between the head-end router and the tail-end router is random, which is not limited herein.

Step 402: The head-end router sends a protection trail establishment request message to a second ingress node of a first optical domain according to an IP address of the second ingress node of the first optical domain, where the protection trail establishment request message carries an ID of the protection trail, the information about the protection trail, an ID, of a first trail, corresponding to the protection trail, and an IP address of a first ingress node and an optical domain to which the first ingress node belongs.

Step 403: A second ingress node of the $i^{th}$ optical domain sends a first trail request message to a first ingress node of the $i^{th}$ optical domain according to the IP address of the first ingress node and the optical domain to which the first ingress node belongs, receives information about a trail that is of the first trail and is in the $i^{th}$ optical domain, where the information is fed back by the first ingress node of the $i^{th}$ optical domain, calculates a trail that is of the second trail and is in the $i^{th}$ optical domain according to the information about the trail that is of the first trail and is in the $i^{th}$ optical domain and a next-hop node of the $i^{th}$ optical domain, and sends a second trail establishment request message to the next-hop node of the $i^{th}$ optical domain according to the trail obtained by calculation, until the next-hop node of the $i^{th}$ optical domain is the tail-end router.

A value of i is successively 1, . . . , and n, where n is a nature number and is a total quantity of optical domains between the head-end router and the tail-end router.

When n=1, that is, when only one optical domain, that is, the first optical domain, is included between the head-end router and the tail-end router, the next-hop node of the first optical domain is the tail-end router; and in this case, step 403 needs to be performed only once.

When n is a nature number greater than 1, that is, when at least two optical domains are included between the head-end router and the tail-end router, if i<n, the next-hop node of the $i^{th}$ optical domain is a second ingress node of the $(i+1)^{th}$ optical domain, and if i=n, a next-hop node of the $n^{th}$ optical domain is the tail-end router; and in this case, step 403 needs to be cyclically performed for n times, so as to send the second trail establishment request message to the tail-end router.

That the second ingress node of the $i^{th}$ optical domain sends the second trail establishment request message to the next-hop node of the $i^{th}$ optical domain according to the trail obtained by calculation refers to a process in which the second ingress node of the $i^{th}$ optical domain sends the second trail establishment request message to the next-hop node that is of the $i^{th}$ optical domain and is on the trail obtained by calculation, and then by analogy, a node on the trail obtained by calculation sends the second trail establishment request message to the next-hop node of the $i^{th}$ optical domain hop by hop.

There is no limitation to a specific calculation method for calculating, by the second ingress node of the $i^{th}$ optical domain, the trail that is of the second trail and is in the $i^{th}$ optical domain according to the information about the trail that is of the first trail and is in the $i^{th}$ optical domain and the next-hop node of the $i^{th}$ optical domain, as long as the trail that is of the first trail and is in the $i^{th}$ optical domain and the trail that is of the second trail and is in the $i^{th}$ optical domain do not overlap.

That a second ingress node of the $i^{th}$ optical domain sends a first trail request message to a first ingress node of the $i^{th}$ optical domain according to the IP address of the first ingress node and the optical domain to which the first ingress node belongs may include that:

the second ingress node of the $i^{th}$ optical domain determines, according to the IP address of the first ingress node and the optical domain to which the first ingress node belongs, an IP address of the first ingress node of the $i^{th}$ optical domain; and sends the first trail request message to the first ingress node of the $i^{th}$ optical domain according to the determined IP address of the first ingress node of the $i^{th}$ optical domain.

Each node that transmits the second trail establishment request message, including the tail-end router, locally stores, in the node, the ID of the second trail and an IP address of a previous-hop node.

In addition, a second ingress node of each optical domain stores the trail that is of the second trail, is in the $i^{th}$ optical domain, and is obtained by calculation. Specifically, the second ingress node of each optical domain may correspondingly store the trail that is of the second trail and is in the $i^{th}$ optical domain and the ID of the second trail.

Step 404: The tail-end router receives the second trail establishment request message, and feeds back a second trail establishment response message to the head-end router.

The second trail establishment response message includes: the ID of the second trail.

The second trail establishment response message is inversely transmitted from the tail-end router to the head-end router hop by hop according to a transmission trail of the second trail establishment request message. Specifically, for a node that transmits the second trail establishment request message, the node receives the second trail establishment response message, determines, according to the ID of the second trail and the IP address of the previous-hop node that are locally stored in the node, an IP address of a previous-hop node corresponding to the ID, carried in the response message, of the second trail, and sends the response message to the previous-hop node according to the IP address of the previous-hop node, until the previous-hop node is the head-end router.

Step 405: The head-end router receives the second trail establishment response message.

When the head-end router receives the second trail establishment response message, it indicates that the second trail is successfully established.

In this embodiment, a second ingress node of each optical domain requests, from a first ingress node in an optical domain to which the second ingress node belongs and according to an IP address of the first ingress node and an optical domain to which the first ingress node belongs, information about a trail that is of a first trail and is in the optical domain, where the IP address and the optical domain are carried in a second trail establishment request message, and determines, according to the information that is about the trail and is fed back by the first ingress node, a trail that is of a second trail and is in the optical domain to which the second ingress node belongs, so as to ensure that a trail that is of the second trail and is in the optical domain to which the second ingress node belongs and a trail that is of the first trail and is in the optical domain to which the second ingress node belongs do not overlap. In addition, in a process of establishing the second trail, information about a trail that is of the first trail and is in each optical domain is only transmitted between a second ingress node and a first ingress node that are in the optical domain, and therefore it is not required to send the information about the trail that is of the first trail and is in each optical domain to a node of another optical domain or a routing domain, which prevents inter-domain leakage of information in an optical domain, thereby improving access security of the optical domain.

Figure 5:
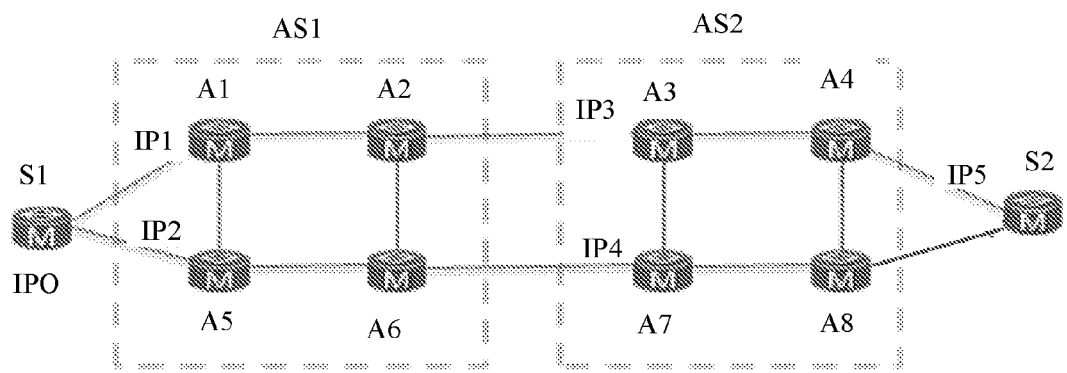
FIG. 5 is a schematic diagram of example 1 of a scenario of a method for establishing a trail in a network according to the present invention.

A method for establishing a trail in the embodiments of the present invention is described with reference to a specific application scenario in the following. Referring to FIG. 5, two optical domains are included between a head-end router S1 and a tail-end router S2, and are respectively: an optical domain AS1 formed by a node A1, a node A2, a node A5, and a node A6, and an optical domain AS2 formed by a node A3, a node A4, a node A7, and a node A8; an IP address of the head-end router S1 is IP0, an IP address of node A1 is IP1, an address of node A3 is IP3, an IP address of node A5 is IP2, an IP address of node A7 is IP4, and an IP address of the tail-end router S2 is IP5.

It is assumed that a first trail that needs to be established is a working trail; then, a process of establishing the working trail includes:

Step A1: The head-end router S1 determines information about the working trail, where it is assumed that the determined information about the working trail is: IP0-IP1-IP3-IP5.

Step A2: The head-end router S1 sends a working trail establishment request message to the node A1 of the optical domain AS1 according to the IP address IP1 of the node A1, where the request message includes the information IP0-IP1-IP3-IP5 about the working trail and an ID of the working trail.

Step A3: The node A1 of the optical domain AS1 calculates a trail that is of the working trail and is in the optical domain AS1 according to the IP address IP3 of the next-hop node A3 of the optical domain AS1, and if it is assumed that a calculation result is: A1-A2, the node A1 sends the request message to the node A2 according to the calculation result, and then the node A2 forwards the request message to the node A3 of the optical domain AS2.

Step A4: The node A3 of the optical domain AS2 calculates a trail that is of the working trail and is in the optical domain AS2 according to the IP address IP5 of the next-hop node S2 of the optical domain AS2, and if it is assumed that a calculation result is: A3-A4, the node A3 sends the request message to the node A4 according to the calculation result, and then the node A4 forwards the request message to the tail-end router S2.

Step A5: The tail-end router receives the request message, and feeds back a working trail establishment response message to the previous-hop node A4, where the response message carries the ID of the working trail.

Step A6: The node A4 forwards the response message to the node A3; the node A3 adds, to the response message, the IP address of the node A3 and the optical domain AS2 to which the node A3 belongs, and sends the response message to the previous-hop node A2; and then the node A2 forwards the response message to the node A1.

Step A7: The node A1 adds, to the response message, the IP address IP1 of the node A1 and the optical domain AS1 to which the node A1 belongs, and sends the response message to the head-end router S1.

In this way, the head-end router S1 may determine, according to the response message, the IP address IP1 of the first ingress node A1 of the working trail in the optical domain AS1, and the IP address IP3 of the first ingress node A3 of the working trail in the optical domain AS2.

After that, a process of establishing a protection trail corresponding to the working trail includes:

Step B1: The head-end router S1 determines information about the protection trail, where it is assumed that the determined information about the protection trail is: IP0-IP2-IP4-IP5.

Step B2: The head-end router S1 sends a protection trail establishment request message to the node A5 of the optical domain AS1 according to the IP address IP2 of the node A5, where the request message includes: an ID of the protection trail, the information IP0-IP2-IP4-IP5 about the protection trail, the ID, of the working trail, corresponding to the protection trail, and an IP address of a first ingress node and an optical domain to which the first ingress node belongs.

The IP address of the first ingress node and the optical domain to which the first ingress node belong include: the IP1 of the optical domain AS1 and the IP3 of the optical domain AS2.

Step B3: The node A5 of the optical domain AS1 determines, according to the IP address of the first ingress node and the optical domain to which the first ingress node belongs, that an IP address of a first ingress node of the optical domain AS1 is IP1, where the IP address and the optical domain are carried in the request message; and sends a first trail request message to the node A1 according to the IP address IP1.

Step B4: The node A1 sends information about a trail that is of a first trail and is in the optical domain AS1 to the node A5, and the node A5 determines, according to the IP address IP4 of a next-hop node of the optical domain AS1 and the information about the trail that is of the first trail and is in the optical domain AS1, a trail that is of a second trail and is in the optical domain AS1, where it is assumed that the trail that is of the second trail and is in the optical domain AS1 is A5-A6.

With reference to step A3, the information about the trail that is of the first trail and is in the optical domain AS1 is A1-A2.

Step B5: The node A5 sends the request message to the node A6, and then the node A6 forwards the request message to the node A7 of the optical domain AS2.

Step B6: For a step performed by the node A7 of the optical domain AS2, reference may be made to step B3 to step B5; a node A8 finally sends the request message to the tail-end router S2.

Step B7: The tail-end router receives the request message, and feeds back a protection trail establishment response message to the head-end router S1 through the node A8, the node A7, the node A6, and the node A5 hop by hop, so as to complete establishment of the protection trail.

Figure 6:
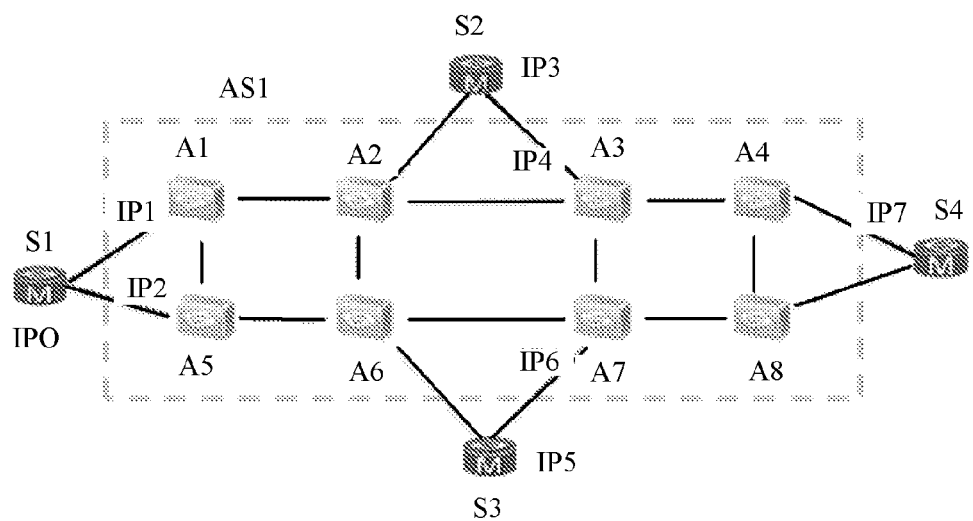
FIG. 6 is a schematic diagram of example 2 of a scenario of a method for establishing a trail in a network according to the present invention.

Referring to FIG. 6, only one optical domain AS1 is included between a head-end router S1 and a tail-end router S4, where the optical domain AS1 is formed by nodes A1 to A8; an IP address of the head-end router S1 is IP0, an IP address of A1 is IP1, an IP address of an intermediate router S2 is IP3, an IP address of A5 is IP2, an IP address of A3 is IP4, an IP address of A7 is IP6, an IP address of an intermediate router S3 is IP5, and an IP address of the tail-end router S4 is IP7.

It is assumed that a working trail that needs to be established is S1-A1-S2-A3-S4; in this case, the working trail may be divided into two parts and the two parts are separately established. Specifically, the head-end router S1 determines a first working trail S1-A1-S2, and the intermediate router S2 determines a second working trail S2-A3-S4.

It is assumed that a protection trail that needs to be established is: S1-A5-S3-A7-S4; in this case, the protection trail may also be divided into two parts and the two parts are separately established. Specifically, the head-end router S1 determines a first protection trail S1-A5-S3, and the intermediate router S2 determines a second protection trail: S3-A7-S4.

Specific methods for establishing a working trail and a protection trail are shown in FIG. 3 and FIG. 4, and are not described herein again.

Figure 7:
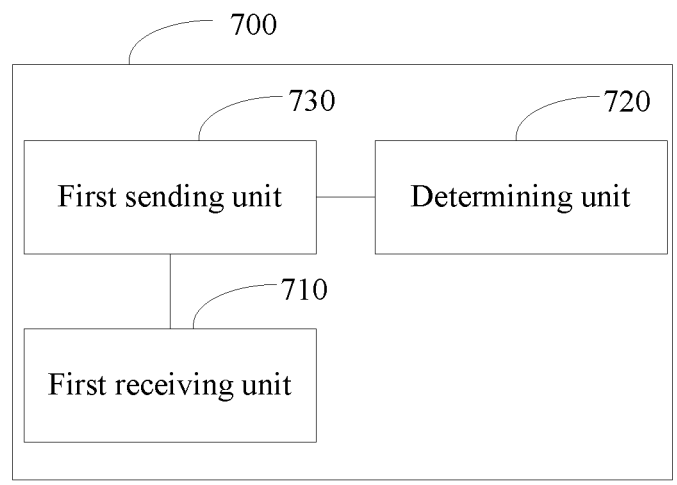
FIG. 7 is a schematic diagram of a first embodiment of an apparatus for establishing a trail in a network according to the present invention.

Referring to FIG. 7, FIG. 7 is a structural diagram of an apparatus for establishing a trail in a network according to an embodiment of the present invention, where the apparatus may be disposed in a first ingress node of each optical domain, and an apparatus 700 may include:

a first receiving unit 710, configured to receive, in a process of establishing a first trail, a first trail establishment request message sent by a previous-hop node of a first ingress node;

a determining unit 720, configured to determine a trail that is of the first trail and is in an optical domain to which the first ingress node belongs; and a first sending unit 730, configured to send, according to the trail determined by the determining unit 720, the first trail establishment request message received by the first receiving unit 710 to a next-hop node of the optical domain to which the first ingress node belongs, where the first receiving unit 710 is further configured to receive a first trail establishment response message that is sent by the next-hop node according to the trail that is of the first trail and is in the optical domain to which the first ingress node belongs;

the first sending unit 730 is further configured to add, to the first trail establishment response message received by the first receiving unit 710, an IP address of the first ingress node and the optical domain to which the first ingress node belongs, and send the first trail establishment response message to the previous-hop node;

the first receiving unit 710 is further configured to receive, in a process of establishing a second trail, a first trail request message sent by a second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message; and the first sending unit 730 is further configured to send, to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap.

Preferably, the first sending unit 730 may be specifically configured to:

when determining that the previous-hop node of the first ingress node and the first ingress node are not located in a same domain, add, to the first trail establishment response message, the IP address of the first ingress node and the optical domain to which the first ingress node belongs.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

Figure 8:
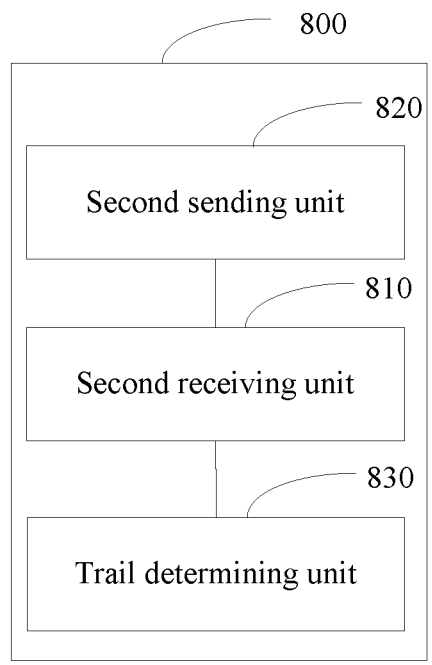
FIG. 8 is a schematic diagram of a second embodiment of an apparatus for establishing a trail in a network according to the present invention.

Referring to FIG. 8, FIG. 8 is a structural diagram of another apparatus for establishing a trail in a network according to an embodiment of the present invention, where the apparatus may be disposed in a second ingress node of each optical domain, and an apparatus 800 may include:

a second receiving unit 810, configured to receive, in a process of establishing a second trail, a second trail establishment request message, where the second trail establishment request message carries an IP address of a first ingress node and an optical domain to which the first ingress node belongs;

a second sending unit 820, configured to send, according to the IP address of the first ingress node and the optical domain to which the first ingress node belongs, a first trail request message to a first ingress node in an optical domain to which a second ingress node belongs, where the IP address and the optical domain are received by the second receiving unit 810, and where the second receiving unit 810 is further configured to receive, after the second sending unit 820 sends the first trail request message, information about a trail that is of a first trail and is in the optical domain to which the second ingress node belongs, where the information is sent by the first ingress node in the optical domain to which the second ingress node belongs; and a trail determining unit 830, configured to determine, according to the information that is about the trail and is received by the second receiving unit 810, a trail that is of the second trail and is in the optical domain to which the second ingress node belongs, where the second trail and the first trail do not overlap.

Preferably, the second sending unit 820 may be specifically configured to:

determine, according to the IP address of the first ingress node and the optical domain to which the first ingress node belongs, an IP address of the first ingress node in the optical domain to which the second ingress node belongs; and send, according to the IP address of the first ingress node in the optical domain to which the second ingress node belongs, the first trail request message to the first ingress node in the optical domain to which the second ingress node belongs.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

Figure 9:
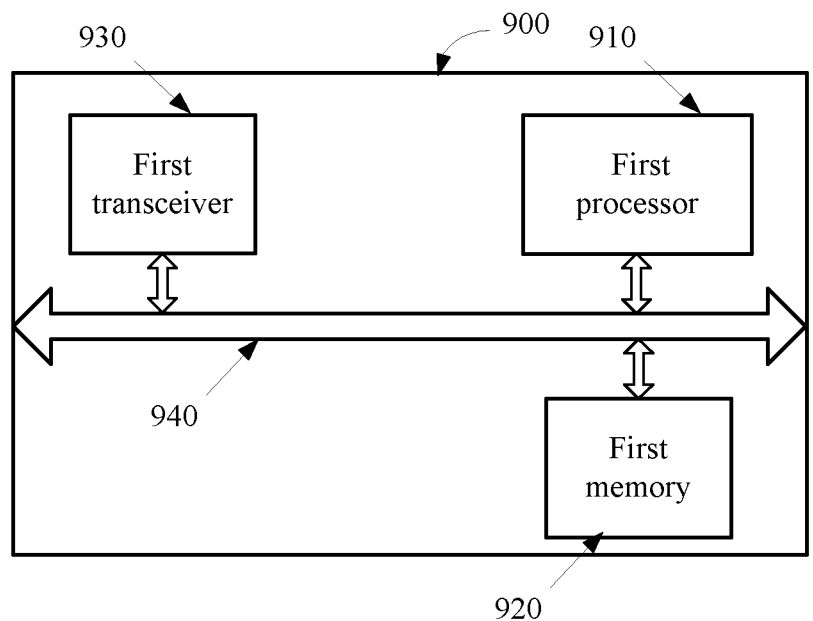
FIG. 9 is a schematic structural diagram of a first ingress node according to the present invention.

Referring to FIG. 9, FIG. 9 is a schematic structural diagram of hardware of a first ingress node according to an embodiment of the present invention, where the hardware includes: a first processor 910, a first memory 920, a first transceiver 930, and a first bus 940.

The first processor 910, the first memory 920, and the first transceiver 930 are connected to each other by using the first bus 940, where the first bus 940 may be an ISA bus, a PCI bus, an EISA bus, or the like. The bus may be classified into an address bus, a data bus, a control bus, and the like. For ease of denotation, the bus is indicated by using only one bold line in FIG. 9; however, it does not indicate that there is only one bus or only one type of bus.

The first memory 920 is configured to store a program. Specifically, the program may include program code, where the program code includes a computer operation instruction. The first memory 920 may include a high-speed RAM memory, and may further include a non-volatile memory (non-volatile memory), for example, at least one disk memory.

The first transceiver 930 is configured to connect to another device and communicate with the another device. The first transceiver 930 is configured to: in a process of establishing a first trail, receive a first trail establishment request message sent by a previous-hop node, send, according to a trail determined by the first processor 910, the first trail establishment request message to a next-hop node of an optical domain to which a first ingress node belongs, receive a first trail establishment response message that is sent by the next-hop node according to a trail that is of the first trail and is in the optical domain to which the first ingress node belongs, add, to the first trail establishment response message, an IP address of the first ingress node and the optical domain to which the first ingress node belongs, and send the first trail establishment response message to the previous-hop node; and in a process of establishing a second trail, receive a first trail request message sent by a second ingress node in the optical domain to which the first ingress node belongs, where the first trail request message is sent, when the second ingress node receives a second trail establishment request message, according to the IP address of the first ingress node and the optical domain to which the first ingress node belongs, where the IP address and the optical domain are carried in the second trail establishment request message, and send, to the second ingress node in the optical domain to which the first ingress node belongs, information about the trail that is of the first trail and is in the optical domain to which the first ingress node belongs, so that the second ingress node determines, according to the information about the trail, a trail that is of the second trail and is in the optical domain to which the first ingress node belongs, where the second trail and the first trail do not overlap.

The first processor 910 executes the program code, and is configured to determine, in the process of establishing the first trail, the trail that is of the first trail and is in the optical domain to which the first ingress node belongs; and is further configured to add, to the first trail establishment response message when the first transceiver 930 sends the first trail establishment response message, the IP address of the first ingress node and the optical domain to which the first ingress node belongs.

Preferably, the first processor 910 is specifically configured to: when determining that the previous-hop node of the first ingress node and the first ingress node are not located in a same domain, add, to the first trail establishment response message, the IP address of the first ingress node and the optical domain to which the first ingress node belongs.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

Figure 10:
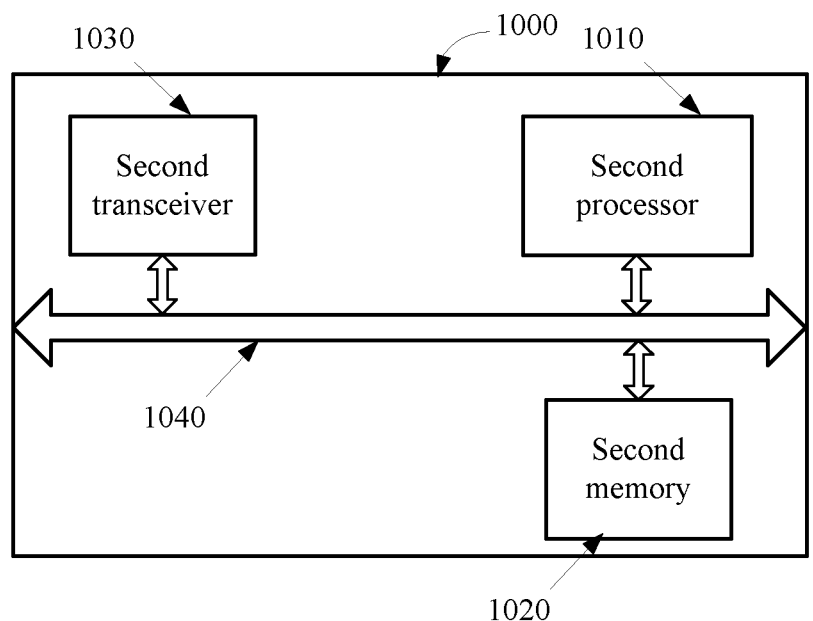
FIG. 10 is a schematic structural diagram of a second ingress node according to the present invention.

Referring to FIG. 10, FIG. 10 is a schematic structural diagram of hardware of a second ingress node according to an embodiment of the present invention, where the micro base station includes: a second processor 1010, a second memory 1020, a second transceiver 1030, and a second bus 1040.

The second processor 1010, the second memory 1020, and the second transceiver 1030 are connected to each other by using the second bus 1040, where the second bus 1040 may be an ISA bus, a PCI bus, an EISA bus, or the like. The bus may be classified into an address bus, a data bus, a control bus, and the like. For ease of denotation, the bus is indicated by using only one bold line in FIG. 10; however, it does not indicate that there is only one bus or only one type of bus.

The second memory 1020 is configured to store a program. Specifically, the program may include program code, where the program code includes a computer operation instruction. The second memory 1020 may include a high-speed RAM memory, and may further include a non-volatile memory (non-volatile memory), for example, at least one disk memory.

The second transceiver 1030 is configured to connect to another device and communicate with the another device. The second transceiver 1030 is configured to: in a process of establishing a second trail, receive a second trail establishment request message, where the second trail establishment request message carries an IP address of a first ingress node and an optical domain to which the first ingress node belongs, send, according to the IP address of the first ingress node and the optical domain to which the first ingress node belongs, a first trail request message to the first ingress node in an optical domain to which the second ingress node belongs, and receive information about a trail that is of a first trail and is in the optical domain to which the second ingress node belongs, where the information is sent by the first ingress node in the optical domain to which the second ingress node belongs.

The second processor 1010 executes the program code, and is configured to determine, according to the information that is about the trail and is received by the second transceiver 1030, a trail that is of the second trail and is in the optical domain to which the second ingress node belongs, where the second trail and the first trail do not overlap.

Preferably, the second processor 1010 is further configured to determine, according to the IP address of the first ingress node and the optical domain to which the first ingress node belongs, an IP address of the first ingress node in the optical domain to which the second ingress node belongs, and provide the IP address for the second transceiver 1030.

The second transceiver 1030 is specifically configured to send, according to the IP address of the first ingress node in the optical domain to which the second ingress node belongs, the first trail request message to the first ingress node in the optical domain to which the second ingress node belongs.

In this embodiment, a first ingress node sends, to a second ingress node in an optical domain to which the first ingress node belongs, information about a trail that is of a first trail and is in the optical domain to which the first ingress node belongs, so that the second ingress node determines, according to the information about the trail, a trail that is of a second trail and is in the optical domain to which the first ingress node belongs, and therefore, it is ensured that the trail that is of the second trail and is in the optical domain to which the first ingress node belongs and the trail that is of the first trail and is in the optical domain to which the first ingress node belongs do not overlap. In addition, in processes of establishing the first trail and the second trail, information about a trail that is of the first trail and is in each optical domain is only transmitted between a second ingress node and a first ingress node, and therefore it is not required to send the information about the trail that is of the first trail and is in each optical domain to a node of another optical domain or a routing domain, which prevents inter-domain leakage of information in an optical domain, thereby improving access security of the optical domain.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for establishing a trail in a network, wherein the network comprises: a head-end router, a tail-end router, and at least one optical domain; each optical domain comprises a first ingress node and a second ingress node; a first trail between the head-end router and the tail-end router passes through the first ingress node of each optical domain; and a second trail between the head-end router and the tail-end router passes through the second ingress node of each optical domain, wherein the method comprises:

in a process of establishing the first trail, receiving, by the first ingress node, a first trail establishment request message sent by a previous-hop node, determining a trail segment of the first trail and is in an optical domain to which the first ingress node belongs, and sending, according to the determined trail, the first trail establishment request message to a next-hop node of the optical domain to which the first ingress node belongs; and receiving, by the first ingress node, a first trail establishment response message sent by the next-hop node according to the trail segment of the first trail and is in the optical domain to which the first ingress node belongs, adding, to the first trail establishment response message, an Internet Protocol (IP) address of the first ingress node and the optical domain to which the first ingress node belongs, and sending the first trail establishment response message to the previous-hop node; and in a process of establishing the second trail, receiving, by the first ingress node, a first trail request message sent by the second ingress node in the optical domain to which the first ingress node belongs, wherein the first trail request message is sent, when the second ingress node receives a second trail establishment request message, according to the IP address of the first ingress node and the optical domain to which the first ingress node belongs, wherein the IP address and the optical domain are carried in the second trail establishment request message; and sending, by the first ingress node to the second ingress node in the optical domain to which the first ingress node belongs, information about the trail segment of the first trail and is in the optical domain to which the first ingress node belongs, so that the second ingress node determines, according to the information about the trail, a trail segment of the second trail and is in the optical domain to which the first ingress node belongs, wherein the second trail and the first trail do not overlap.

2. The method according to claim 1, wherein the adding, by the first ingress node to the first trail establishment response message, an IP address of the first ingress node and the optical domain to which the first ingress node belongs comprises:

adding, by the first ingress node to the first trail establishment response message, the IP address of the first ingress node and the optical domain to which the first ingress node belongs, when determining that the previous-hop node of the first ingress node and the first ingress node are not located in a same domain.

3. A method for establishing a trail in a network, wherein the network comprises: a head-end router, a tail-end router, and at least one optical domain; each optical domain comprises a first ingress node and a second ingress node; a first trail between the head-end router and the tail-end router passes through the first ingress node of each optical domain; and a second trail between the head-end router and the tail-end router passes through the second ingress node of each optical domain, wherein the method comprises:

in a process of establishing the second trail, receiving, by the second ingress node, a second trail establishment request message, wherein the second trail establishment request message carries an Internet Protocol (IP) address of the first ingress node and an optical domain to which the first ingress node belongs;

sending, by the second ingress node according to the IP address of the first ingress node and the optical domain to which the first ingress node belongs, a first trail request message to the first ingress node in an optical domain to which the second ingress node belongs; and receiving, by the second ingress node, information about a trail segment of the first trail and is in the optical domain to which the second ingress node belongs, wherein the information is sent by the first ingress node in the optical domain to which the second ingress node belongs, and determining, according to the information about the trail, a trail segment of the second trail and is in the optical domain to which the second ingress node belongs, wherein the second trail and the first trail do not overlap.

4. The method according to claim 3, wherein the sending, by the second ingress node according to the IP address of the first ingress node and the optical domain to which the first ingress node belongs, a first trail request message to the first ingress node in an optical domain to which the second ingress node belongs comprises:

determining, by the second ingress node according to the IP address of the first ingress node and the optical domain to which the first ingress node belongs, an IP address of the first ingress node in the optical domain to which the second ingress node belongs; and sending, by the second ingress node according to the IP address of the first ingress node in the optical domain to which the second ingress node belongs, the first trail request message to the first ingress node in the optical domain to which the second ingress node belongs.

5. An apparatus for establishing a trail in a network, wherein the apparatus is applied to a first ingress node in the network; the network comprises: a head-end router, a tail-end router, and at least one optical domain; each optical domain comprises a first ingress node and a second ingress node; a first trail between the head-end router and the tail-end router passes through the first ingress node of each optical domain; and a second trail between the head-end router and the tail-end router passes through the second ingress node of each optical domain, wherein the apparatus comprises:

a memory storing instructions;
and a processor configured to execute the instructions to:
receive, in a process of establishing the first trail, a first trail establishment request message sent by a previous-hop node of the first ingress node;
determine a trail segment of the first trail and is in an optical domain to which the first ingress node belongs;
send, according to the trail determined by the determining unit, the first trail establishment request message to a next-hop node of the optical domain to which the first ingress node belongs;
receive a first trail establishment response message sent by the next-hop node according to the trail segment of the first trail and is in the optical domain to which the first ingress node belongs;
add, to the first trail establishment response message, an Internet Protocol (IP) address of the first ingress node and the optical domain to which the first ingress node belongs, and send the first trail establishment response message to the previous-hop node of the first ingress node;
receive, in a process of establishing the second trail, a first trail request message sent by the second ingress node in the optical domain to which the first ingress node belongs, wherein the first trail request message is sent, when the second ingress node receives a second trail establishment request message, according to the IP address of the first ingress node and the optical domain to which the first ingress node belongs, wherein the IP address and the optical domain are carried in the second trail establishment request message; and
send, to the second ingress node in the optical domain to which the first ingress node belongs, information about the trail segment of the first trail and is in the optical domain to which the first ingress node belongs, so that the second ingress node determines, according to the information about the trail, a trail segment of the second trail and is in the optical domain to which the first ingress node belongs, wherein the second trail and the first trail do not overlap.

6. The apparatus according to claim 5, wherein the processor configured to execute the instructions to:
when determining that the previous-hop node of the first ingress node and the first ingress node are not located in a same domain, add, to the first trail establishment response message, the IP address of the first ingress node and the optical domain to which the first ingress node belongs.

7. An apparatus for establishing a trail in a network, wherein the apparatus is applied to a second ingress node in the network; the network comprises: a head-end router, a tail-end router, and at least one optical domain; each optical domain comprises a first ingress node and a second ingress node; a first trail between the head-end router and the tail-end router passes through the first ingress node of each optical domain; and a second trail between the head-end router and the tail-end router passes through the second ingress node of each optical domain, wherein the apparatus comprises:

a memory storing instructions;
a processor configured to execute the instructions to:
receive, in a process of establishing the second trail, a second trail establishment request message, wherein the second trail establishment request message carries an Internet Protocol (IP) address of the first ingress node and an optical domain to which the first ingress node belongs;

send, according to the IP address of the first ingress node and the optical domain to which the first ingress node belongs, a first trail request message to the first ingress node in an optical domain to which the second ingress node belongs, wherein the IP address and the optical domain are received, and wherein receive information about a trail segment of the first trail and is in the optical domain to which the second ingress node belongs, wherein the information is sent by the first ingress node in the optical domain to which the second ingress node belongs; and determine, according to the information about the trail and is received, a trail segment of the second trail and is in the optical domain to which the second ingress node belongs, wherein the second trail and the first trail do not overlap.

8. The apparatus according to claim 7, wherein the processor further configured to execute the instructions to:

determine, according to the IP address of the first ingress node and the optical domain to which the first ingress node belongs, an IP address of the first ingress node in the optical domain to which the second ingress node belongs; and send, according to the IP address of the first ingress node in the optical domain to which the second ingress node belongs, the first trail request message to the first ingress node in the optical domain to which the second ingress node belongs.

* * * * *